United States Patent [19]

Morin

[11] 4,366,648

[45] Jan. 4, 1983

[54] TREE SAP COLLECTION APPARATUS

[76] Inventor: Marius J. Morin, 1465 Eastwind Cir., Westlake Village, Calif. 91361

[21] Appl. No.: 214,522

[22] Filed: Dec. 9, 1980

[51] Int. Cl.³ ............................................. A01G 23/10
[52] U.S. Cl. ........................................ 47/52; 137/607
[58] Field of Search ...................... 47/10–12, 47/50–54; 215/273–287; 137/602, 625.4, 381; D23/1; 285/156, 239, 238; 128/205.24

[56] References Cited

U.S. PATENT DOCUMENTS

| 282,188 | 7/1883 | Gilberds | 215/280 |
| 423,928 | 3/1890 | Howe | 215/286 |
| 971,602 | 10/1910 | Gladding | 137/381 |
| 2,525,419 | 10/1950 | Mellinger et al. | 137/602 X |
| 3,046,696 | 7/1962 | Breen et al. | 47/52 |

FOREIGN PATENT DOCUMENTS

| 112301 | 1/1941 | Australia | 215/287 |
| 587304 | 11/1959 | Canada | 47/52 |
| 742374 | 11/1962 | Canada | 47/52 |
| 284472 | 5/1915 | Fed. Rep. of Germany | 215/287 |
| 2527463 | 12/1976 | Fed. Rep. of Germany | 137/625.4 |
| 591518 | 7/1925 | France | 47/53 |

*Primary Examiner*—James R. Feyrer
*Attorney, Agent, or Firm*—Jack C. Munro

[57] ABSTRACT

A tree sap collection system which comprises a main conduit extending through a grove of trees with branch conduits extending from the main conduit to each tree. Each branch conduit is connected to the main conduit through a coupling. The coupling includes a plurality of equiangularly spaced-apart connectors with each connector to engage with a separate branch conduit. Each branch conduit terminates in a spout. The spout is to be inserted within a hole formed within a tree. The spout is to be connectable with a closure device when the spout is not in use. The closure device includes a frame which connects with a plug which is located within the access opening of the spout and extends around the exterior of the spout for tightly retaining the plug within the access opening of the spout.

12 Claims, 16 Drawing Figures

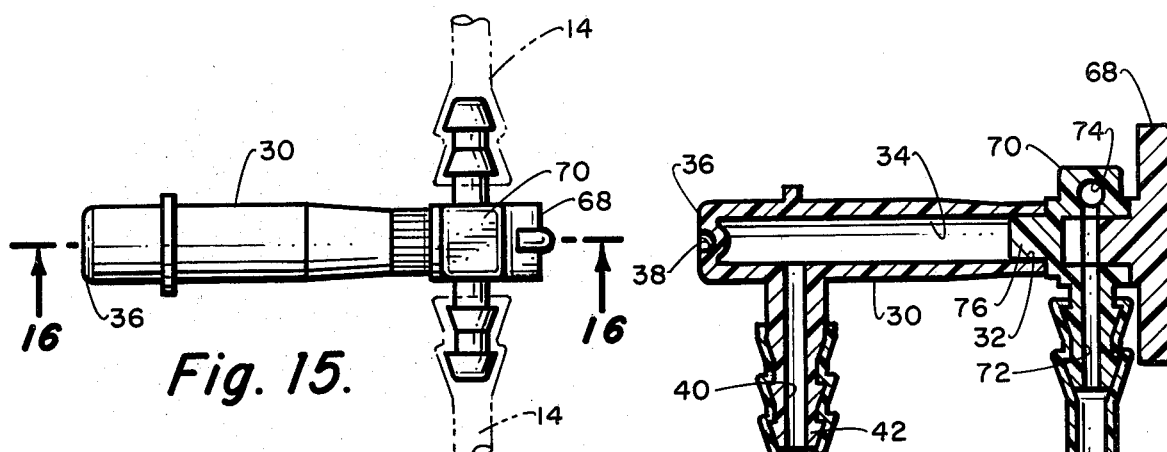
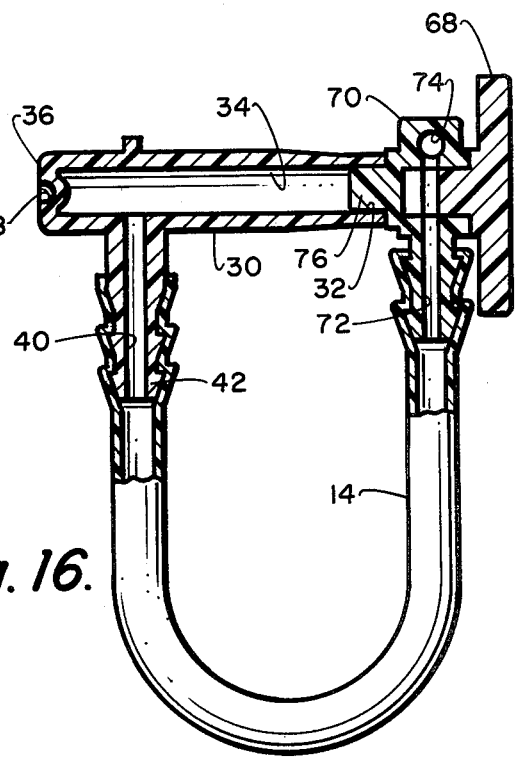
Fig. 15.
Fig. 16.

TREE SAP COLLECTION APPARATUS

BACKGROUND OF THE INVENTION

The field of this invention relates to tree sap collection apparatuses, and more particularly for parts therefor which facilitate maximum collection of tree sap.

It is well known that maple syrup comes from maple trees. In the past few years, a system has evolved for obtaining a substantially increased amount of sap from the trees than was previously possible. This system includes the locating of a spout within the trunk of each tree. Each spout is connected to a branch conduit. The branch conduits are then connected to a main conduit. The main conduit in turn is to conduct the tree sap into a storage container. A vacuum is applied into the main conduit and, hence, to the branch conduits to facilitate extraction of the sap from the tree.

The extraction of the sap from maple trees occurs for only a short period of time each year. This means that the tree sap extraction system remains dormant for most of the year. It is not at all unusual to have several thousand trees in a single farm which are tapped. Because of the large number of trees involved, it is desired that during the time this conduit system is not in use, that it remain installed throughout the year with only the spout which was inserted within each tree, being removed. Each spout is then to be plugged in order to prevent the entry of foreign materials, such as dirt or insects.

Additionally, the conduit system should be structured so as to completely eliminate kinking of any of the conduits. The kinking of a branch conduit to a tree will result in that tree producing very little sap.

SUMMARY OF THE INVENTION

The tree sap collection system wherein a cylindrically shaped spout is inserted within each tree trunk. Each spout is connected to its own branch conduit. Each branch conduit is connected to a coupling. Each coupling can connect with as many as six different branch conduits. Each coupling is connected to a main conduit, which in turn is to conduct the tree sap to a deposit area. A vacuum is to be applied through the entire conduit system. Mounted on each branch conduit is a closure device for each spout. The closure device comprises a plug which is to tightly interfit within the access opening of the spout. The plug is attached to a frame which is to be stretched and located about the aft end of the spout. Between the aft end of the spout and the frame, there is an engagement assembly to maintain the established position between the frame and the spout. This engagement assembly is to comprise a pair of interfitting members, such as a protuberance and a recess. A handle means is mounted on the frame to facilitate connection and disconnection of the spout to the closure device. A valve may be included within the coupling for preventing flow between its respective branch conduits and main conduit.

The primary objective of this invention is to construct an improved version of a tree sap collection system wherein the collection of the sap is accomplished more efficiently and when the collection system is not in use, the system is totally protected from contamination by foreign objects.

BRIEF DESCRIPTION OF THE DRAWINGS

FIG. 15 is a plan view showing a modified form of tee-connection which includes a valve and also includes a plug device for a spout; and FIG. 16 is a cross-sectional view taken along along line 16—16 of FIG. 15.

DETAILED DESCRIPTION OF THE SHOWN EMBODIMENTS

Figure 1:
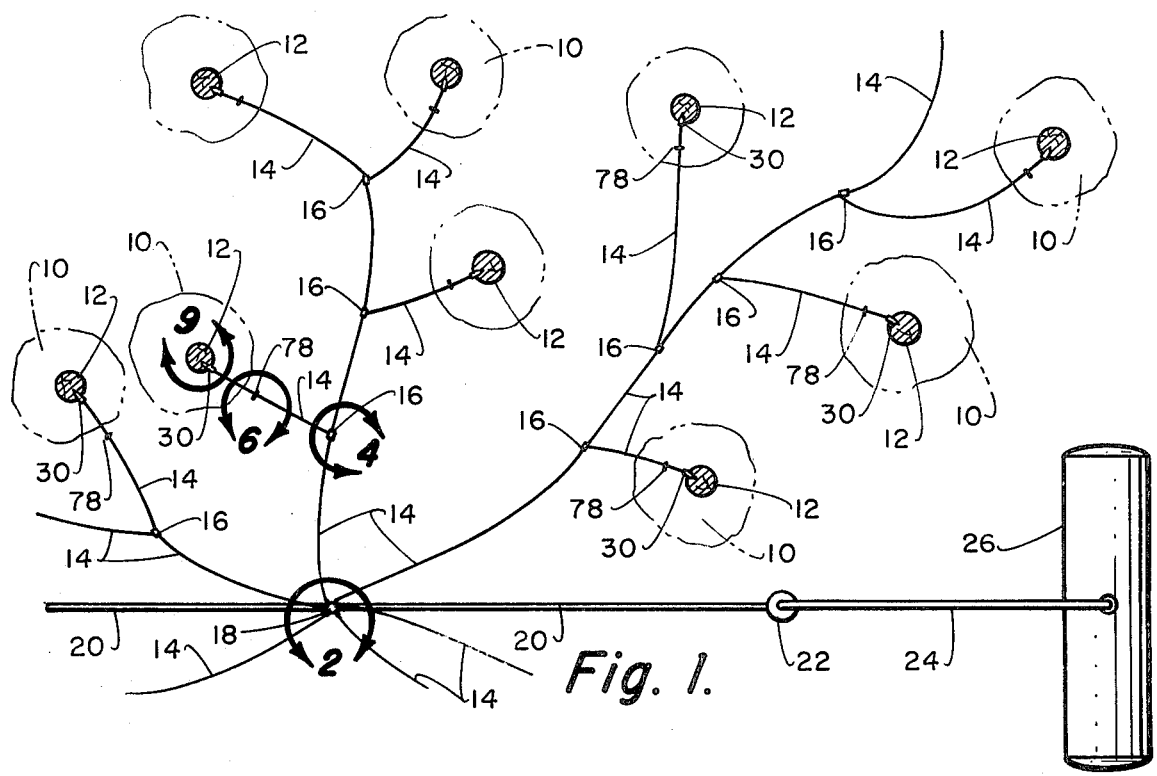
FIG. 1 is a diagramatic view of a grove a trees depicting a typical installation of the tree sap collection system of this invention.

Referring particularly to the drawings, there is shown in FIG. 1 a plurality of spaced-apart maple trees 10, each of which has a tree trunk 12. Extending to each tree trunk 12 is a branch conduit 14. Branch conduits which are located in the same general vicinity are connected together through tee-coupling 16. The connected together branch conduits 14 are then be connected to a main line coupling 18. Main line coupling 18 is connected within the main line 20. It is to be understood that the branch conduits 14, as well as the main line 20, are constructed of flexible tubing such as plastic. It is to be understood that the diameter of the branch lines 14 is substantially smaller than the diameter the main line 20. A typical example would be for each branch line to have a fluid conducting passage of approximately one fourth of an inch in diameter, while the main line 20 has a fluid conducting passage of five-eights of an inch in diameter.

The most downstream section of the main line 20 is connected into a vacuum pump 22. The vacuum pump 22 is located within a conduit 24, which in turn is to deposit the tree sap liquid into the storage tank 26. The liquid tree sap is then to be subsequentially processed.

Figure 9:
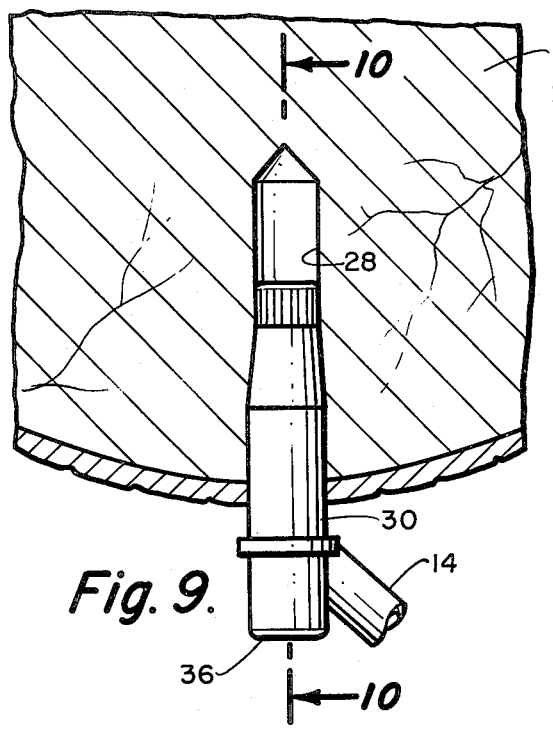
FIG. 9 is a cross-sectional view taken along line 9—9 of FIG. 1 showing the spout being mounted within a tree trunk.
Figure 10:
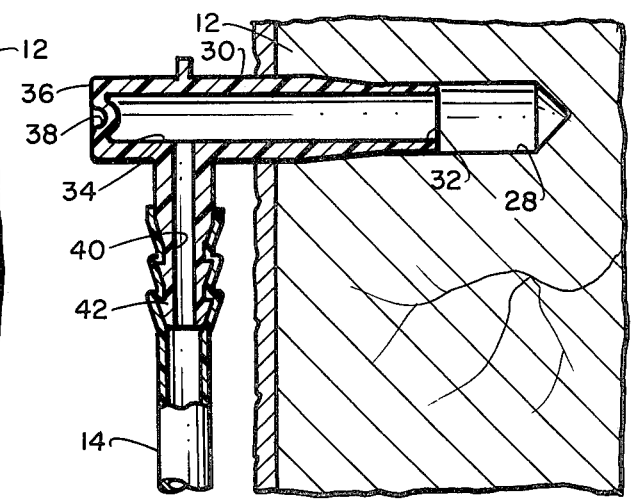
FIG. 10 is a cross-sectional view through the spout taken along line 10—10 of FIG. 9.
Figure 11:
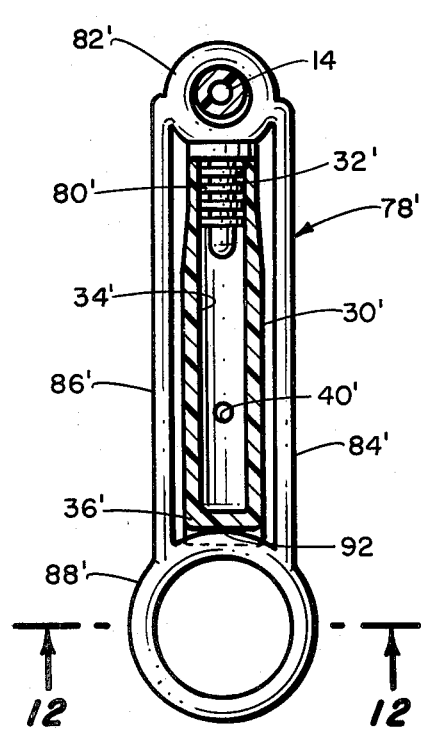
FIG. 11 is a view similar to FIG. 7, but showing a first modified form of closure device which is connected to a spout.

Referring particularly to FIGS. 9 and 10, each tree trunk 12 is to have a hole 28 formed therein. A spout 30 is to be forced into the hole 28. The innermost end of the spout 30 includes an access opening 32. The access opening 32 connects with spout passage 34. Spout passage 34 is closed at the back end by spout back wall 36. Exteriorly formed within the back wall 36 is a recess 38. The function of the recess 38 will be explained further on in the specification.

Through the side wall of the spout 30 is formed a connecting passage 40. The passage 40 is mounted within a first connector 42. The exterior surface of the first connector 42 is formed into a plurality of spaced-apart annular ridges. An end of the conduit 14 is to be forcibly inserted over the connector 42 with the ridges functioning to securely retain in position the conduit 14. It is to be readily apparent that sap from the tree 12 is to be conducted within the hole 28, through access opening 32 into the passage 34 through passage 40 to within the interior of the branch conduit 14.

Figure 4:
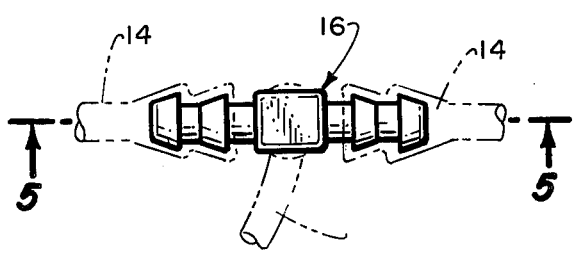
FIG. 4 is an enlarged plan view taken along line 4—4 of FIG. 1 showing a tee-connection connecting one branch conduit to another branch conduit.
Figure 5:
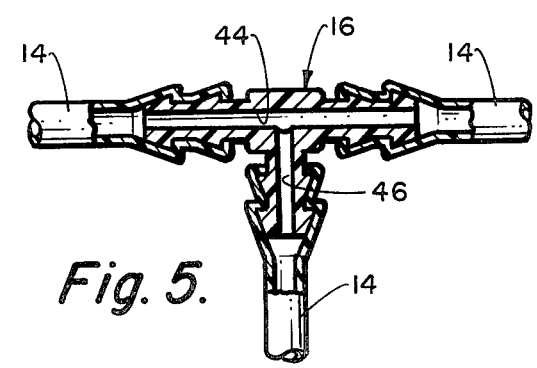
FIG. 5 is a cross-sectional view through the tee-connection taken along line 5—5 of FIG. 4.

Referring particularly to FIGS. 4 and 5, the branch conduits 14 are to be connected together through a tee-connection 16.

Within each tee-connection 16 is formed a main passage 44 and a connecting passage 46. It is to be understood that appropriate connectors similar to connectors 42 are included within the tee connection 16 so as to facilitate secure connection to the branch conduits 14.

Figure 2:
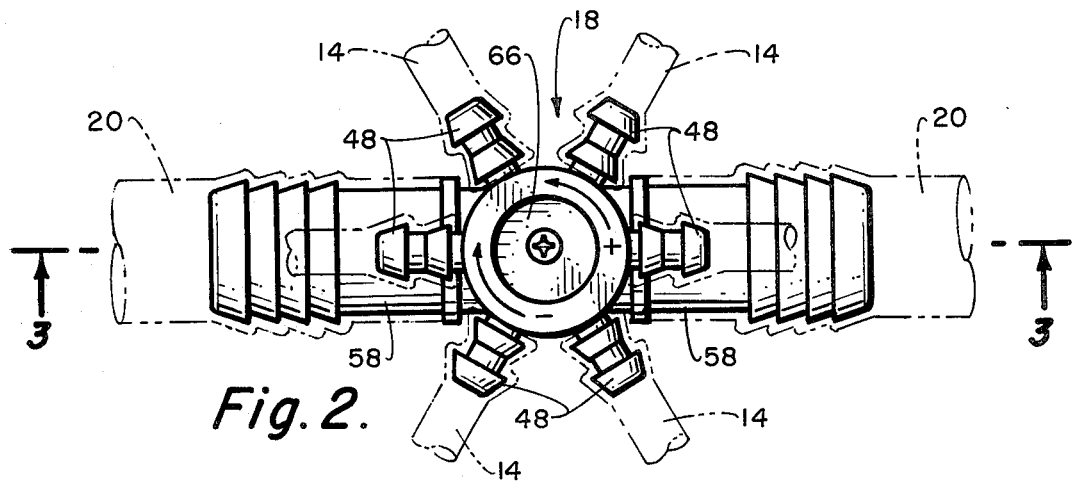
FIG. 2 is an enlarged plan view taken along line 2—2 of FIG. 1 of a coupling which is utilized to connect a plurality of branch conduits to a main conduit.

The most downstream section of the branch conduit 14 for a given number of trees within a single area is connected onto a connector 48 of a coupling 18. It is to be understood that the connector 48 also includes ridges similar to the ridges formed on the connector 42. As is apparent within FIG. 2, it can be seen that there are six in number of the connectors 48 which are located in an equiangularly spaced-apart manner. Also, the longitudinal center axes of each connector 48 lie within the same plane.

Figure 3:
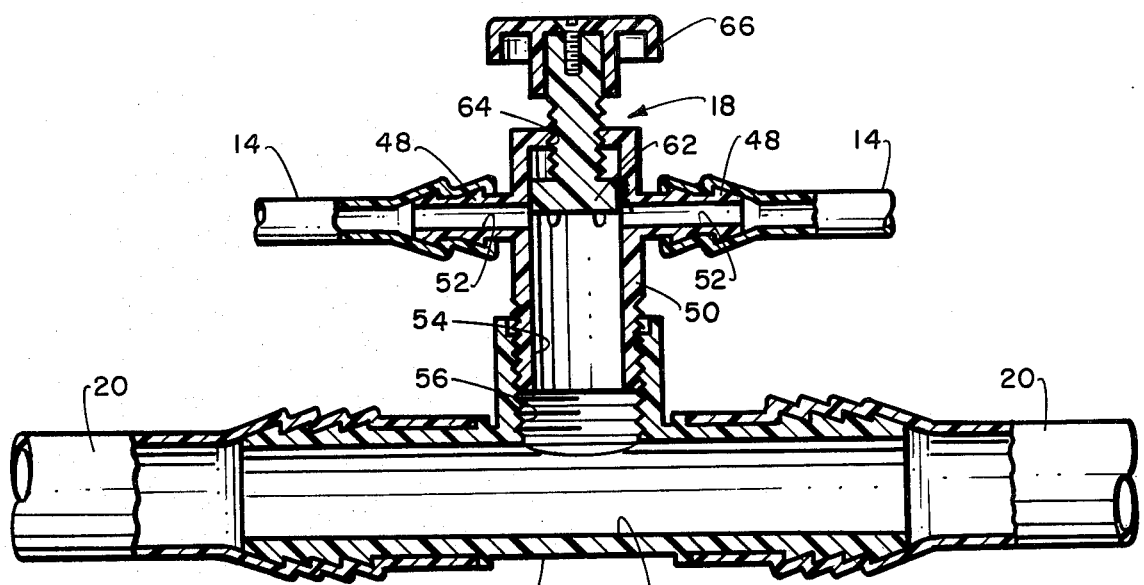
FIG. 3 is a cross-sectional view through the coupling taken along line 3—3 of FIG. 2.

Each of the connectors 48 are integrally secured to and extend outwardly from a main housing 50. Each connector 48 includes a connecting passage 52. The connecting passages 52 connect with a central passage 54 formed within the housing 50. One end of the housing 50 is threadably secured within threaded opening 56 formed within main line conduit section 58. Formed within the main line conduit section 58 is a main passage 60. Exteriorly formed on main line conduit section 58 are again a plurality of annular ridges which are to facilitate connection to main line conduit sections 20, as is clearly shown in FIG. 3.

The housing 50 may or may not include a valving mechanism. If it is desired to include a valving mechanism 50, then that mechanism is to include a plunger 62 which is threadably mounted within a hole 64 formed within the outermost end of the housing 50. The outer portion of the plunger 62 is fixedly secured to a handle section 66. Rotation of the handle section 66 causes longitudinal movement of the plunger 62 with respect to the housing 50, which then can cause the plunger 62 to be located to either block passages 52 or connect the passages 52 to the main passage 54. This valve mechanism is to be utilized during the time it is required to clean the conduit system after it has been used. The cleaning procedure will normally require the conducting of a cleaning solution in a reverse direction through the conduit system. During this procedure, the valving mechanism can be employed to selectively conduct the cleaning solution to different portions of the conduit system in order to facilitate complete cleaning of the system. It is to be understood that during cleaning of the entire system, the spouts 30 are removed from their respective holes 28. Any conventional device could be used for producing a positive fluid pressure throughout the conduit system. During cleaning, the vacuum pump 22 would be disconnected or could be used in reverse to apply the positive pressure.

Again, for the same reason to facilitate the cleaning, it may be desirable to include a hand operated valve member 68 within a tee-coupling 70, which is similar to the tee-coupling 16. This hand operated valve member 68 is to be rotatable to close the connecting passage 72 in respect to the main passage 74. Also, a protuberance in the form of a plug 76 may be exteriorly formed on the housing of the tee-connection 70 a protuberance in the form of a plug 76. This plug 76 is adapted to tightly interfit within the access opening 32 of the spout 30. During the time that the spout 30 is not located within the tree trunk 12, the plug 76 is to be located within the access opening 32 and prevent entry of foreign material and insects to within the spout passage 34.

As previously mentioned, the collection system of this invention is in a non-use position for better than eleven months out of every year. During this time, it is desirable to keep foreign materials, such as insects and dirt, from entry to within the conduit system. One way that this is accomplished is by, as previously discussed, the use of the plug 76, which is to close off the access opening 32 of each spout 30. However, it is normally desired that an extremely positive connection be achieved with respect to each spout 30 that will not be able to become accidentally dislodged during the extended period of time of non-use. Also, such a positive connection is desirable during the time that cleaning fluid is forced in reverse direction through the conduit system. Since this cleaning solution will be under pressure, there will be a tendency for the plug to become dislodged from the access opening 32.

Figure 6:
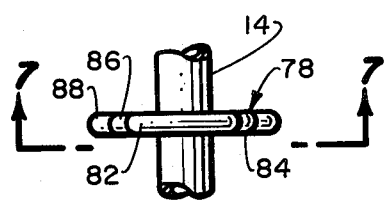
FIG. 6 is an enlarged plan view taken along line 6—6 of FIG. 1 showing an end view of a closure device which is employed in conjunction with each spout which is to be mounted within each tree.
Figure 7:
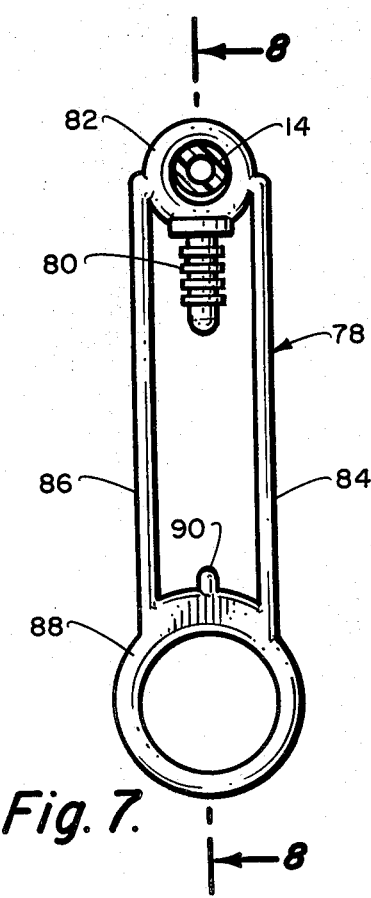
FIG. 7 is a side view of the closure device taken along line 7—7 of FIG. 6.
Figure 8:
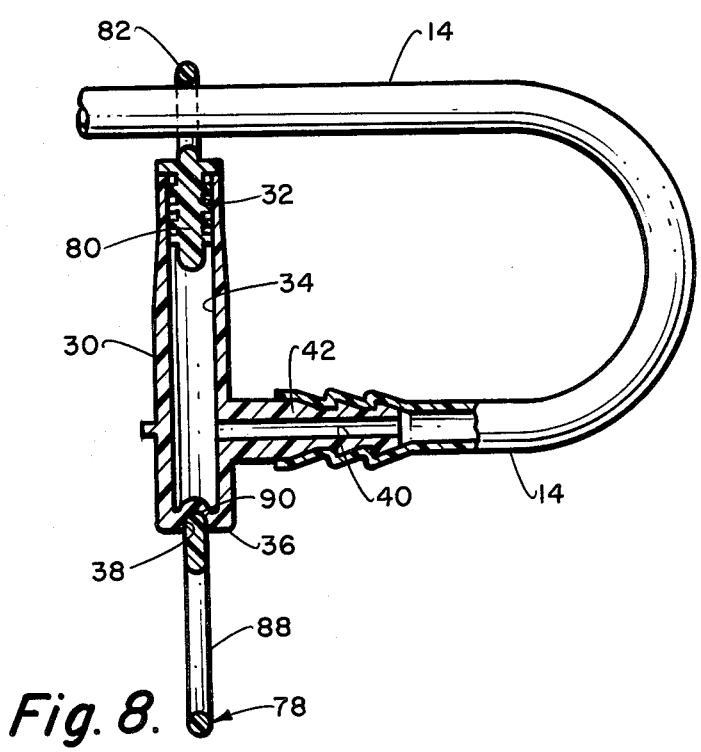
FIG. 8 is a partly in cross-sectional view of the closure device of this invention taken along line 8—8 of FIG. 7 showing a spout connected to the closure device.

Referring particularly to FIGS. 6, 7 and 8 of the drawings, there is shown a closure device 78 which includes a plug 80. This plug 80 tightly fits within the access opening 32 of the spout 30. The plug 80 is integrally connected to a ring 82. Extending through the ring 82 in a loose fitting manner is a branch conduit 14.

Integrally attached to the ring 82 and extending therefrom is a pair of spaced apart parallel arms 84 and 86 which, in essence, are part of a frame. The arms 84 and 86 are integrally connected at the free ends thereof to a grasping ring 88. Attached to the exterior surface of the grasping ring 88 and located in the space between the arms 84 and 86 is a protuberance 90.

The operator is to grasp the spout 30 and insert the plug 80 to within the access opening 32. The operator then applies a force to the grasping ring 88 tending to slightly stretch the arms 84 and 86. The operator then proceeds to locate the protuberance 90 within the recess 38. At this particular position, the plug 80 will be tightly retained within the access opening 32 and will be maintained in that position until the operator again grasps the ring 88 and applys an outward force with respect to the spout, disengaging the protuberance 90 from the recess 38, thereby permitting disconnection of the spout 30 from the plug 80. It is to be noted that this disengagement process, as well as the engagement process is a simple, single step action, which can be quickly and easily accomplished. It is to be noted that the reason for conducting of the branch conduit 14 through the locating ring 82 is so that the closure 78 will be closely retained to the spout 30 to which it is to be connected when the closure 78 is not in use. This will prevent the closure 78 from becoming lost.

Referring particularly to FIGS. 11 and 12, and FIGS. 13 and 14, there is shown, respectively, a first modified form 78' and a second modified form 78" of the closure device. Like numerals have been employed to refer to like parts and for a discussion of the function of these parts, reference is to be had to the previous discussion regarding closure 78. The main distinction of the closure 78' has to do with the forming of a groove 92 within the back end 36' of the spout 30' instead of the recess 38, as shown within the spout 30. Instead of the protuberance 90, a portion of the grasping ring 88' is to be locatable within the groove 92. Therefore, the same positive locking action is obtained with the closure device 78' as with the closure device 78.

Figure 13:
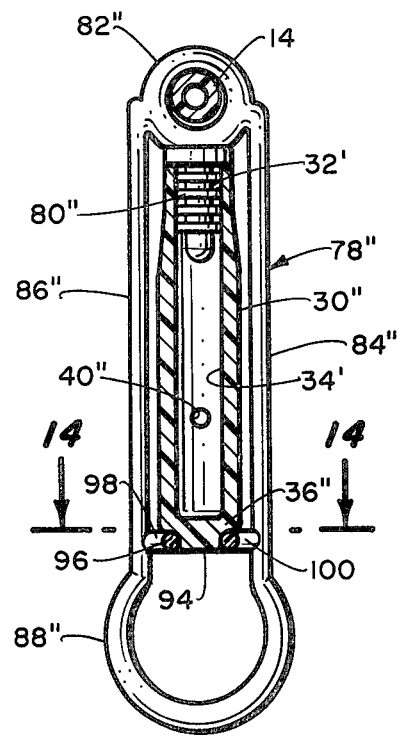
FIG. 13 is a view similar to FIG. 11, but of a second modified form of closure device.
Figure 12:
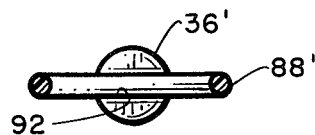
FIG. 12 is a view taken along line 12—12 of FIG. 11.
Figure 14:
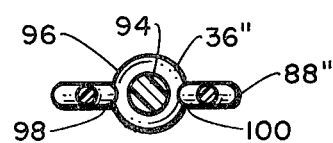
FIG. 14 is a cross-sectional view taken along line 14—14 of FIG. 13.

In a similar manner, referring particularly to FIGS. 13 and 14, the back end of the spout 36' has been formed to have a raised section 94. This raised section 94 is to be locatable within ring 96. The ring 96 is integrally connected by connecting arms 98 and 100 to the respective arms 86" and 84". Therefore, a similar positive locking action is obtained through the use of the raised section 94 and the ring 96.

In a similar manner, referring particularly to FIGS. 13 and 14, the back end of the spout 36' has been formed to have a raised section 94. This raised section 94 is to be locatable within ring 96. The ring 96 is integrally connected by connecting arms 98 and 100 to the respective arms 86" and 84". Therefore, the similar positive locking action is obtained through the use of the raised section and the ring 96.

What is claimed is:

1. In combination with a tree insertable spout for sap collection, said spout having an internal passage through which liquid is to flow, the outer end of said passage terminating in an access opening to the ambient, the inner end of said passage being closed at the aft end of said spout, a connecting passage extending through the wall of said spout which connects with said internal passage, a closure means for said access opening of said spout, said closure means comprising:

a plug for tightly fitting in said access opening, said plug being attached to a locking device, said locking device to tightly engage through engagement means with said aft end of said spout thereby securing the position of said plug in said access opening, with said locking device disengaged from said aft end of said spout the said plug is removable from said access opening;

said locking device including a frame, said frame having a front end and a back end, said plug being located at said front of said frame, said engagement means being located directly adjacent said back end of said frame, said back end of said frame also including handle means to facilitate installation and removal of said plug from said access opening; and said front end also including a ring, a branch conduit connected with said connecting passage of said spout, said branch conduit to extend through said ring in a loose fitting manner.

2. A tree sap collection system comprising:

a main conduit having a first longitudinal center axis;

a first branch conduit extending from said main conduit, said first branch conduit having a first inner end and a first outer end, a coupling connecting said main conduit and said first inner end of said first branch conduit for conducting of liquid therebetween, said coupling having a plurality of separate connectors, each said connector having a second longitudinal center axis, said second longitudinal center axis of said connectors being located in a single plane, said single plane being spaced from said first longitudinal center axis, a second branch conduit having a second inner end and a second outer end, said second inner end of said second branch conduit being connected to a said connector, said connectors being equiangularly spaced apart; and a spout connected to said outer end of said first branch conduit, said spout having an access opening connecting said first branch conduit to the ambient, liquid adapted to be moved through said access opening into said spout and into said first conduit.

3. The tree sap collection system as defined in claim 2 wherein:

said coupling including a manually operable valve, said valve being movable between an open position and a closed position, said closed position preventing flow of said liquid from said first and second branch conduits into said main conduit, said open position permitting flow of said liquid from said first and second branch conduits into said main conduit.

4. The tree sap collection system as defined in claim 2 wherein:

a plug being mounted on the exterior surface of said coupling, said plug to be locatable in a tight fitting manner within said access opening of said spout when said spout is not being used.

5. The tree sap collection system as defined in claim 2 wherein:

there being six in number of said connectors.

6. The tree sap collection system as defined in claim 2 including:

closure means for enclosing said access opening of said spout, said spout having a fore end and an aft end, said access opening formed within said fore end of said spout, said closure means including a plug for tight fitting in said access opening, said closure means also including a locking device, said locking device to engage through engagement means with said aft end of said spout thereby securing the position of said plug in said access opening.

7. The tree sap collection system as defined in claim 6 wherein:

said engagement means comprising a pair of interlocking members.

8. The tree sap collection system as defined in claim 7 wherein:

said pair of interlocking members comprising a recess formed within said aft end of said spout and a protuberance mounted upon said frame.

9. The tree sap collection system as defined in claim 7 wherein:

said pair of interlocking members comprising a protuberance formed on said aft end of said spout which is to engage with a ring mounted within said frame.

10. The tree sap collection system as defined in claim 7 wherein:

said locking device including a frame, said frame being integrally connected between said plug and one of the members of said pair of interlocking members, with said pair of interlocking members engaged the said frame exerts a continuous bias upon said plug tending to maintain said plug in tight engagement with said access opening.

11. The tree sap collection system as defined in claim 10 wherein:

said frame including a connecting means, said connecting means to connect with a single said branch conduit, said connecting means permitting longitudinal movement of said branch conduit in respect to said frame.

12. The tree sap collection system as defined in claim 11 wherein:

said connecting means comprising a ring, said branch conduit to be conducted through said ring in a loose fitting manner.

* * * * *